US009477574B2

(12) United States Patent
Tumanov et al.

(10) Patent No.: US 9,477,574 B2
(45) Date of Patent: Oct. 25, 2016

(54) COLLECTION OF INTRANET ACTIVITY DATA

(75) Inventors: Ilya Tumanov, Redmond, WA (US); John Wana, Seattle, WA (US); George Perantatos, Seattle, WA (US); Brian R. Meyers, Issaquah, WA (US); Gary Caldwell, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/106,113

(22) Filed: May 12, 2011

(65) Prior Publication Data

US 2012/0290545 A1 Nov. 15, 2012

(51) Int. Cl.
*G06F 7/00* (2006.01)
*G06F 17/00* (2006.01)
*G06F 11/34* (2006.01)

(52) U.S. Cl.
CPC ........ *G06F 11/3438* (2013.01); *G06F 11/3495* (2013.01); *G06F 2201/875* (2013.01)

(58) Field of Classification Search
CPC ... H04L 67/22; H04L 63/0263; G06Q 10/10; G06F 17/30011; G06F 21/6227; G06F 17/30067; G06F 17/30286
USPC ................................................. 707/661–694
See application file for complete search history.

(56) References Cited

U.S. PATENT DOCUMENTS

| | | | |
|---|---|---|---|
| 6,025,841 | A | 2/2000 | Finkelstein et al. |
| 6,241,524 | B1 | 6/2001 | Aoshima et al. |
| 6,282,548 | B1 | 8/2001 | Burner et al. |

(Continued)

FOREIGN PATENT DOCUMENTS

| | | |
|---|---|---|
| AU | 2011248879 B2 | 10/2014 |
| CN | 19141750 | 4/2007 |

(Continued)

OTHER PUBLICATIONS

Radu Rusu, et al., "Usage Event Logging in Windows SharePoint Services", Jul. 2004: http://msdn.microsoft.com/en-us/library/dd583134(office.11).aspx.

(Continued)

*Primary Examiner* — Tuan A Pham
(74) *Attorney, Agent, or Firm* — Jessica Meyers; Tom Wong; Micky Minhas (57) ABSTRACT

Systems, methods and computer program products for facilitating the collection of data within a computer network (especially an intranet) while complying with applicable privacy laws and regulations, as well as individual organizations' rules addressing intranet users' privacy are disclosed. Such systems, methods and computer program products allow for the collecting of activity information related to computer-based activities performed by users while logged into an organization's intranet. Such activity includes navigating to URLs, opening and editing documents, writing, opening and reading email and instant messages, and the like. The collecting, consolidating, storing and exposing of such activity information—while ensuring privacy requirements—serves as a basis for high-value services (e.g., augmenting documents with extra information, improving search results, automatic news feeds, social networking announcements, etc.) to be offered and provisioned to such users.

15 Claims, 6 Drawing Sheets

(56) References Cited

U.S. PATENT DOCUMENTS

| | | | |
|---|---|---|---|
| 6,340,977 B1 | 1/2002 | Lui | |
| 6,714,929 B1 | 3/2004 | Micaelian et al. | |
| 6,782,414 B1 | 8/2004 | Xue et al. | |
| 7,035,926 B1* | 4/2006 | Cohen et al. | 709/225 |
| 7,225,175 B2 | 5/2007 | Higgins et al. | |
| 7,266,376 B2 | 9/2007 | Nakagawa | |
| 7,346,606 B2 | 3/2008 | Bharat | |
| 7,353,246 B1* | 4/2008 | Rosen | G06F 17/30855 707/999.01 |
| 7,472,119 B2 | 12/2008 | Dai | |
| 7,493,521 B1 | 2/2009 | Li et al. | |
| 7,716,240 B2 | 5/2010 | Lim | |
| 7,725,530 B2 | 5/2010 | Sah et al. | |
| 7,756,753 B1 | 7/2010 | McFarland | |
| 7,757,170 B2 | 7/2010 | Billsus et al. | |
| 7,827,254 B1 | 11/2010 | Nevill-Manning et al. | |
| 7,962,466 B2 | 6/2011 | Jones et al. | |
| 8,010,527 B2 | 8/2011 | Denoue et al. | |
| 8,160,983 B2 | 4/2012 | Fitzmaurice et al. | |
| 8,229,873 B1 | 7/2012 | Dolan et al. | |
| 8,301,482 B2 | 10/2012 | Reynolds et al. | |
| 8,468,201 B2 | 6/2013 | Dasilva et al. | |
| 8,606,792 B1 | 12/2013 | Jackson et al. | |
| 8,707,431 B2* | 4/2014 | Stephens | H04L 41/5061 726/22 |
| 8,819,009 B2 | 8/2014 | Wana et al. | |
| 8,832,099 B2* | 9/2014 | Howes | G06F 17/30011 705/14.1 |
| 8,979,538 B2 | 3/2015 | Michelstein et al. | |
| 2001/0021914 A1 | 9/2001 | Jacobi et al. | |
| 2002/0007373 A1 | 1/2002 | Blair et al. | |
| 2002/0015056 A1 | 2/2002 | Weinlaender | |
| 2002/0099812 A1 | 7/2002 | Davis et al. | |
| 2003/0014331 A1 | 1/2003 | Simons | |
| 2003/0014399 A1 | 1/2003 | Hansen et al. | |
| 2003/0014654 A1* | 1/2003 | Adler et al. | 713/200 |
| 2003/0061200 A1 | 3/2003 | Hubert et al. | |
| 2003/0197738 A1 | 10/2003 | Beit-Suri | |
| 2003/0229808 A1* | 12/2003 | Heintz et al. | 713/201 |
| 2004/0015868 A1 | 1/2004 | Dutta et al. | |
| 2004/0030741 A1 | 2/2004 | Wolton et al. | |
| 2004/0034706 A1 | 2/2004 | Cohen et al. | |
| 2004/0210532 A1 | 10/2004 | Nagawa et al. | |
| 2004/0230530 A1* | 11/2004 | Searl et al. | 705/51 |
| 2004/0267701 A1 | 12/2004 | Horvitz et al. | |
| 2005/0033657 A1 | 2/2005 | Herrington et al. | |
| 2005/0097465 A1 | 5/2005 | Giesen et al. | |
| 2005/0154764 A1 | 7/2005 | Riegler et al. | |
| 2005/0165715 A1 | 7/2005 | Farnham et al. | |
| 2005/0203807 A1 | 9/2005 | Bezos et al. | |
| 2005/0222987 A1 | 10/2005 | Vadon | |
| 2006/0004698 A1 | 1/2006 | Pyhalammi | |
| 2006/0004914 A1 | 1/2006 | Kelly et al. | |
| 2006/0015821 A1 | 1/2006 | Jacques Parker et al. | |
| 2006/0036950 A1 | 2/2006 | Himberger | |
| 2006/0036964 A1 | 2/2006 | Satterfield | |
| 2006/0036965 A1 | 2/2006 | Harris | |
| 2006/0041562 A1 | 2/2006 | Paczkowski et al. | |
| 2006/0064411 A1 | 3/2006 | Gross et al. | |
| 2006/0069617 A1* | 3/2006 | Milener | G06F 17/30902 705/14.69 |
| 2006/0105302 A1 | 5/2006 | Breiburg et al. | |
| 2006/0127871 A1 | 6/2006 | Grayson | |
| 2006/0143066 A1 | 6/2006 | Calabria | |
| 2006/0200432 A1 | 9/2006 | Flinn et al. | |
| 2006/0247940 A1 | 11/2006 | Zhu et al. | |
| 2006/0277468 A1 | 12/2006 | Sapir | |
| 2006/0294086 A1 | 12/2006 | Rose et al. | |
| 2007/0016553 A1 | 1/2007 | Dumais et al. | |
| 2007/0112768 A1 | 5/2007 | Majumder | |
| 2007/0168909 A1 | 7/2007 | Vaidyanathan et al. | |
| 2007/0233671 A1 | 10/2007 | Oztekin et al. | |
| 2007/0239680 A1 | 10/2007 | Oztekin et al. | |
| 2007/0245020 A1 | 10/2007 | Ott | |
| 2007/0299631 A1* | 12/2007 | Macbeth et al. | 702/187 |
| 2008/0040474 A1 | 2/2008 | Zuckerberg et al. | |
| 2008/0040673 A1* | 2/2008 | Zuckerberg et al. | 715/745 |
| 2008/0059516 A1 | 3/2008 | Cui | |
| 2008/0109722 A1 | 5/2008 | Gengler et al. | |
| 2008/0109723 A1 | 5/2008 | Burton et al. | |
| 2008/0140674 A1 | 6/2008 | Ishikawa | |
| 2008/0141168 A1 | 6/2008 | Ryan et al. | |
| 2008/0147424 A1 | 6/2008 | Rowan et al. | |
| 2008/0155471 A1 | 6/2008 | Lynn et al. | |
| 2008/0177623 A1 | 7/2008 | Fritsch et al. | |
| 2008/0189122 A1 | 8/2008 | Coletrane et al. | |
| 2008/0189253 A1 | 8/2008 | Oliver et al. | |
| 2008/0209320 A1 | 8/2008 | Mawhinney et al. | |
| 2008/0235594 A1 | 9/2008 | Bhumkar et al. | |
| 2008/0256050 A1 | 10/2008 | Zhang | |
| 2008/0261191 A1 | 10/2008 | Woolf | |
| 2008/0270398 A1 | 10/2008 | Landau et al. | |
| 2008/0276179 A1* | 11/2008 | Borenstein et al. | 715/736 |
| 2008/0280662 A1 | 11/2008 | Matwin et al. | |
| 2008/0303689 A1 | 12/2008 | Iverson | |
| 2009/0006371 A1 | 1/2009 | Denoue et al. | |
| 2009/0019039 A1 | 1/2009 | Brindley et al. | |
| 2009/0024712 A1 | 1/2009 | Weiss et al. | |
| 2009/0030927 A1 | 1/2009 | Cases | |
| 2009/0035733 A1 | 2/2009 | Meitar et al. | |
| 2009/0049141 A1 | 2/2009 | Jones et al. | |
| 2009/0055369 A1 | 2/2009 | Phillips et al. | |
| 2009/0055477 A1* | 2/2009 | Flesher | G06F 17/30165 709/204 |
| 2009/0070412 A1* | 3/2009 | D'Angelo et al. | 709/203 |
| 2009/0087820 A1 | 4/2009 | Chandless | |
| 2009/0089380 A1 | 4/2009 | Wang et al. | |
| 2009/0125597 A1* | 5/2009 | Carr et al. | 709/206 |
| 2009/0126231 A1 | 5/2009 | Vogel et al. | 48/127.7 |
| 2009/0150362 A1* | 6/2009 | Evenhaim | 707/3 |
| 2009/0150507 A1 | 6/2009 | Davis | |
| 2009/0177754 A1 | 7/2009 | Brezina | |
| 2009/0187631 A1 | 7/2009 | Su et al. | |
| 2009/0198562 A1 | 8/2009 | Wiesinger et al. | |
| 2009/0216741 A1 | 8/2009 | Thrall | |
| 2009/0217178 A1 | 8/2009 | Niyogi et al. | |
| 2009/0221371 A1 | 9/2009 | Bakshi et al. | |
| 2009/0248661 A1 | 10/2009 | Bilenko | |
| 2009/0254499 A1 | 10/2009 | Deyo | |
| 2009/0282000 A1 | 11/2009 | Bennett | |
| 2009/0299824 A1 | 12/2009 | Barnes, Jr. | |
| 2009/0299963 A1 | 12/2009 | Pippuri | |
| 2009/0300716 A1* | 12/2009 | Ahn | 726/1 |
| 2009/0312033 A1 | 12/2009 | Shen et al. | |
| 2009/0319350 A1 | 12/2009 | Cansler | |
| 2010/0010968 A1* | 1/2010 | Redlich et al. | 707/3 |
| 2010/0017870 A1* | 1/2010 | Kargupta | 726/14 |
| 2010/0031162 A1 | 2/2010 | Wiser et al. | |
| 2010/0049852 A1 | 2/2010 | Whitnah et al. | |
| 2010/0058185 A1 | 3/2010 | Commarford | |
| 2010/0082357 A1 | 4/2010 | Follmann et al. | |
| 2010/0095353 A1 | 4/2010 | Athsani et al. | |
| 2010/0125541 A1 | 5/2010 | Wendel et al. | |
| 2010/0125562 A1 | 5/2010 | Nair et al. | |
| 2010/0125604 A1 | 5/2010 | Martinez et al. | |
| 2010/0131452 A1 | 5/2010 | Fitzmaurice et al. | |
| 2010/0137049 A1 | 6/2010 | Epstein | |
| 2010/0146118 A1 | 6/2010 | Wie | |
| 2010/0174712 A1 | 7/2010 | Li et al. | |
| 2010/0177938 A1 | 7/2010 | Martinez et al. | |
| 2010/0184495 A1 | 7/2010 | Levy et al. | |
| 2010/0221694 A1 | 9/2010 | Moshenberg | |
| 2010/0257179 A1 | 10/2010 | Arrouye et al. | |
| 2010/0257489 A1 | 10/2010 | Sakanaba | |
| 2010/0263045 A1 | 10/2010 | Dulitz | |
| 2010/0269158 A1 | 10/2010 | Ehler et al. | |
| 2010/0274815 A1 | 10/2010 | Vanasco | |
| 2010/0281035 A1 | 11/2010 | Carmel et al. | |
| 2010/0287213 A1 | 11/2010 | Rolls | |
| 2010/0293190 A1 | 11/2010 | Kaiser et al. | |
| 2010/0331064 A1 | 12/2010 | Michelstein et al. | |
| 2010/0331075 A1 | 12/2010 | Michelstein | |
| 2011/0066507 A1 | 3/2011 | Iyer et al. | |
| 2011/0093460 A1 | 4/2011 | Lunt et al. | |

(56) References Cited

U.S. PATENT DOCUMENTS

| | | |
|---|---|---|
| 2011/0131491 A1 | 6/2011 | Lu et al. |
| 2011/0173316 A1 | 7/2011 | Moromisato et al. |
| 2011/0179025 A1 | 7/2011 | Chuang |
| 2011/0270850 A1 | 11/2011 | Wana et al. |
| 2011/0271328 A1 | 11/2011 | Sutton-Shearer |
| 2011/0276925 A1 | 11/2011 | Tumanov et al. |
| 2011/0294564 A1 | 12/2011 | Michelstein et al. |
| 2011/0294565 A1 | 12/2011 | Michelstein et al. |
| 2012/0041972 A1 | 2/2012 | Goldberg |
| 2012/0117470 A1 | 5/2012 | Michelstein |
| 2012/0191715 A1 | 7/2012 | Ruffner et al. |
| 2012/0233161 A1 | 9/2012 | Xu et al. |
| 2012/0233544 A1 | 9/2012 | Roy |
| 2012/0271831 A1 | 10/2012 | Narayanan et al. |
| 2012/0290565 A1 | 11/2012 | Wana et al. |
| 2012/0290637 A1 | 11/2012 | Perantatos |
| 2013/0282706 A1 | 10/2013 | Yoo |

FOREIGN PATENT DOCUMENTS

| | | |
|---|---|---|
| CN | 101071493 A | 11/2007 |
| CN | 101079841 | 11/2007 |
| CN | 101095140 | 12/2007 |
| CN | 101589360 A | 11/2009 |
| CN | 101636737 A | 1/2010 |
| JP | 2006-092023 | 4/2006 |
| JP | 2009151373 A | 7/2009 |
| JP | 2009-199226 | 9/2009 |
| KR | 10-2007-0096198 | 10/2007 |
| WO | 2007056822 A1 | 5/2007 |
| WO | WO 2008/032950 A1 | 3/2008 |
| WO | WO 2008/060032 A1 | 5/2008 |
| WO | WO 2008/133368 A1 | 11/2008 |
| WO | 2009/063469 | 1/2009 |
| WO | WO 2010/048172 A1 | 4/2010 |

OTHER PUBLICATIONS

Nagaraju Pappu, "A Knowledge Framework for Enterprise Application Systems Management", Nov. 2007: http://msdn.microsoft.com/en-us/library/bb897546.aspx.

"Courion Access Assurance Suite 8.0 Revolutionizes IAM by Integrating Critical Aspects of Compliance and Risk Mitigation", Feb. 23, 2010: http://www.courion.com/company/press_release.html?id=594.

Michael Paskevicius, "Introduction to learning and knowledge analytics", Jan. 13, 2011: http://www.bluelightdistrict.org/wp/?p=4534.

Final Office Action mailed Jul. 9, 2013, in co-pending U.S. Appl. No. 13/106,149.

"My6Sense for iPhone Studies Your Reading Habits, Recommends New Articles Based From It," Jul. 31, 2009: http://www.phoneblog.com/app-reviews/my6sense-for-iphone-studies-your-reading-habits-recommends-new-articles-based-from-it/.

Amazon.com Recommendations: Item-to-item collaborative filtering, Linden, G. Smith, B. And York, J., Jan./Feb. 2003 Internet Computing, IEEE, vol. 7, Issue 1, pp. 76-80, http://ieeexplore.ieee.org/xpls/abs_all.jsp?arnumber=1167344&tag=1.

An Online News Recommender System for Social Networks, Manish Agrawal, Maryam Karimzadehgan, ChengXiang Zhai, 2009, pp. 1-4, http://www.researchgate.net/publication/228576256_An_online_news_recommender_system_for_social_networks.

Bailey et al., Link Augmentation: A Context-Based Approach to Support Adaptive Hypermedia, published 2001, 8 pages.

Bilenko et al.; Mining the Search Trails of Surfmg Crowds: Identifying Relevant Websites from User Activity; Apr. 21-25, 2008; 10 pages.

Courtenage et al.; Automatic Hyperlink Creation Using P2P and Publish/Subscribe, published Apr. 2005, 8 pages.

Goecks et al.; Automatically Labeling Web Pages Based on Normal User Actions, published 1999, 5 pages.

Group-Based Recipe Recommendations: Analysis of Data Aggregation Strategeies, Shlomo Berkovsky and Jill Freyne, Sep. 2010, RecSys2010, pp. 112-118 http://dl.acm.org/citation.cfm?id=1864732.

GroupLens: An Open Architecture for Collaborative Filtering of Netnews, Paul Resnick et al., 2009, pp. 175-186 http://dl.acm.org/citation.cfm?id=192905.

GroupLens: Applying Collaborative Filtering to Usenet News, Joseph A. Konstan et al., Mar. 1997, Communications of the ACM, vol. 40, No. 3, http://dl.acm.orgicitation.cfm?id=245126.

He et al., A Social Network-Based Recommender System (SNRS), Doctoral Dissertation, University of California, 2010, 32 pages.

Huajing Li et al., "Personalized Feed Recommendation Service for Social Networks," Aug. 20-22, 2010: http://ieeexplore.ieee.org/stamp/stamp.jsp?arnumber=05590802.

International Search Report and Written Opinion cited in International Application No. PCT/US2011/032805 mailed Nov. 28, 2011.

International Search Report and Written Opinion cited in International Application No. PCT/US2011/031999 mailed Dec. 19, 2011.

Li et al.; Combining Usage, Content, and Structure Data to Improve Web Site Recommendation, published 2004, 11 pages.

Louis Gray, "Cascaad Taps Social Graph for Tailored News," Feb. 7, 2010: http://blog.louisgray.com/2010/02/cascaad-taps-social-graph-for-tailored.html.

Mark Arend, "Colleagues, Social Distance & Relevance in People Search; Social Networking Tools," May 1, 2008: http://blogs.msdn.com/b/markarend/archive/2008/05/01/colleagues-social-distance-relevance-in-people-search-social-networking-tools.aspx.

Paul Marsden, "f-commerce Unleashed: Microsoft, Pandora & Yelp Show the Open Graph Way," May 6, 2010: http://socialcommercetoday.com/f-commerce-unleashed-microsoft-pandora-yelp-show-the-open-graph-way/.

Ryan Lawler, "Is the Social Graph Good for Video Recommendations?," Dec. 15, 2010: http://gigaom.com/video/clicker-facebook/.

Wu Ze-jun et al., "Personalized Recommendation System for E-Commerce Based on Psychological Community," May 16-17, 2009: http://ieeexplore.ieee.org/stamp/stamp.jsp?tp=&arnumber=5173235.

Yoav Artzi, et al., "Instance Based Social Network Representation," University of Washington, 2010: http://www.amitlevy.com/papers/community.pdf.

Yoo et al.; Mining Social Networks for Personalized Email Prioritization; Jul. 1, 2009; 9 pages.

Advisory Action mailed Dec. 27, 2012, in co-pending U.S. Appl. No. 12/771,290.

Final Office Action mailed Oct. 12, 2012, in co-pending U.S. Appl. No. 12/771,290.

Office Action mailed May 8, 2012, in co-pending U.S. Appl. No. 12/771,290.

Office Action mailed Jun. 17, 2013, in co-pending U.S. Appl. No. 12/773,319.

Office Action mailed Jan. 30, 2013, in co-pending U.S. Appl. No. 13/106,149.

Anthony Salcito, "Ribbon Hero: Game-Based Learning for Office", Jan. 22, 2010: http://blogs.msdn.com/b/microsoftuseducation/archive/2010/01/22/ribbon-hero-game-based-learning-for-office.aspx.

Jennifer P. Michelstein, "Play Ribbon Hero and Hone Your Microsoft Office Skills", Jan. 19, 2010: http://www.officelabs.com/lists/posts/post.aspx?id=88.

"Ribbon Hero-Boost Your Microsoft Office Skills With This Fun Add-On", Feb. 17, 2010: http://www.makeuseof.com/tag/ribbon-hero-boost-microsoft-office-skills-fun-addon/.

Kevin Abo, "Microsoft Office Labs Ribbon Hero", Mar. 5, 2010: http://windowslive.com/connect/post/4e7ac6a8-109e-44c3-b969-196c41ff5ec7.

Office Action mailed Dec. 7, 2012, in U.S. Appl. No. 13/111,101, 28 pages.

Office Action mailed Dec. 7, 2012, in U.S. Appl. No. 13/111,192, 18 pages.

Office Action mailed Sep. 26, 2012, in U.S. Appl. No. 13/106,307, 12 pages.

(56) References Cited

OTHER PUBLICATIONS

Mark Prensky; "The Motivation of Gameplay or, the REAL 21st century learning revolution"; 2002; 14 pages.
Gil Taran; "Using Games in Software Engineering Education to Teach Risk Management"; 20th Conference on Software Enginnering Education & Training (CSEET '07); 2007; 8 pages.
Basu, Saikat; Ribbon Hero, published Feb. 17, 2010, 11 pages.
Divelements; SandRibbon Version History, published Aug. 5, 2009, 4 pages.
Foss Software; Elegant Ribbon—Summary, Foss Software, © 2010, 3 pages.
IBM; Defining Help Panel Text, IBM © 1990, 2008, 6 pages.
Microsoft Office Labs Ribbon Hero, © 2010, 3 pages.
Pushing Pixels, published Apr. 10, 2010, 5 pages.
WPF Scrolling Content with Flicks and Gestures, accessed at: http://www.threobotgeek.net/articles/WPF_Scrolling_Content.aspx, accessed on Oct. 13, 2010, 5 pages.
Office Action mailed Aug. 1, 2012, in U.S. Appl. No. 12/943,668.
Office Action mailed Oct. 24, 2012, in U.S. Appl. No. 12/943,668.
Office Action mailed Jan. 3, 2013, in U.S. Appl. No. 12/492,588, 24 pages.
WO 2009/063469 A2; May 22, 2009; Israel; Moshenberg, Kalia.
Zheng, "Search Commands . . . ", Apr. 28, 2008, 10 pages.
Office Action mailed Jan. 28, 2013, in U.S. Appl. No. 12/790,472, 23 pages.
Office Action mailed Feb. 13, 2013, in U.S. Appl. No. 13/106,307, 17 pages.
Office Action mailed Mar. 28, 2013, in U.S. Appl. No. 12/943,668, 31 pgs.
Final Office Action mailed May 22, 2013, in U.S. Appl. No. 12/790,472, 32 pgs.
Final Office Action mailed May 22, 2013, in U.S. Appl. No. 12/492,588, 37 pgs.
Final Office Action mailed Jun. 28, 2013, in U.S. Appl. No. 13/111,101, 39 pgs.
Office Action mailed Jul. 2, 2013, in U.S. Appl. No. 13/111,192, 32 pgs.
Final Office Action mailed Aug. 28, 2013, in U.S. Appl. No. 12/943,668, 32 pgs.
Office Action mailed Nov. 29, 2013, in U.S. Appl. No. 13/106,113, 30 pgs.
Office Action mailed Jan. 3, 2014, in U.S. Appl. No. 12/790,472, 41 pgs.
Office Action mailed Jan. 3, 2014, in U.S. Appl. No. 12/492,588, 48 pgs.
Office Action mailed Oct. 24, 2013, in U.S. Appl. No. 12/773,319, 28 pgs.
Office Action mailed Feb. 26, 2014, in Australian Application No. 2011248879, 3 pgs.
Australian Office Action dated May 1, 2014 in Appln No. 2011248879.
Notice of Acceptance dated Sep. 18, 2014 in Appln No. 2011248879, 2 pgs.
Chinese Office Action dated Nov. 4, 2014 in Appln No. 20118002158.3, 13 pgs.
Office Action mailed Sep. 11, 2014, in U.S. Appl. No. 12/771,290, 39 pgs.
Office Action mailed Sep. 12, 2014, in U.S. Appl. No. 13/111,101, 70 pgs.
Office Action mailed Sep. 18, 2014, in U.S. Appl. No. 13/111,192, 49 pgs.
Office Action mailed Oct. 10, 2014, in U.S. Appl. No. 12/492,588, 44 pgs.
Office Action mailed Oct. 14, 2014, in U.S. Appl. No. 12/773,319, 25 pgs.
Office Action mailed Nov. 19, 2014, in U.S. Appl. No. 12/943,668, 53 pgs.
Office Action mailed Dec. 15, 2014, in U.S. Appl. No. 13/106,149, 52 pgs.
Chinese Office Action dated Oct. 30, 2014 in Appln No. 201180022229.X, 17 pgs.
Notice of Allowance mailed Oct. 24, 2014 in U.S. Appl. No. 12/790,472, 23 pgs.
Corrected Notice of Allowance mailed Dec. 12, 2014 in U.S. Appl. No. 12/790,472, 7 pgs.
Office Action mailed Jul. 17, 2014, in U.S. Appl. No. 12/790,472, 38 pgs.
Office Action mailed Jul. 18, 2014, in U.S. Appl. No. 12/492,588, 42 pgs.
Office Action mailed Aug. 13, 2014, in U.S. Appl. No. 12/773,319, 30 pgs.
Chinese Second Office Action dated Jun. 18, 2015 in Appln No. 201180021588.3, 10 pgs.
Chinese Office Action dated Nov. 4, 2014 in Appln No. 201180021588.3, 13 pgs.
Japanese Office Action dated Mar. 25, 2015 in Appln No. 2013-507984, 6 pgs.
Chinese Office Action dated Apr. 14, 2015 in Appln No. 201180022229.X, 13 pgs.
Office Action mailed Mar. 20, 2015, in U.S. Appl. No. 12/771,290, 31 pgs.
Office Action mailed Apr. 23, 2015, in U.S. Appl. No. 13/111,101, 58 pgs.
Office Action mailed May 11, 2015, in U.S. Appl. No. 12/492,588, 31 pgs.
Office Action mailed May 15, 2015, in U.S. Appl. No. 13/111,192, 25 pgs.
Office Action mailed Jan. 11, 2016, in U.S. Appl. No. 12/773,319, 51 pgs.
Chinese Third Office Action dated Dec. 16, 2015 in Appln No. 201180021588.3, 10 pgs.
Chinese Notice of Grant dated Feb. 5, 2016 in Appln No. 201180022229.X, 4 pgs.
European Office Action in application 11777815.9, mailed Mar. 29, 2016, 1 pg.
European Search Report Issued in Patent Application No. 11777815.9, Mailed Date: Mar. 8, 2016, 06 Pages.
Japanese Office Action dated Feb. 3, 2016 in Appln No. 2013-507984, 2 pgs. (No English Translation).
Grech, "Publishing on the WWW . . . ", Images Paediatr Cardiol. Oct.-Dec. 2001; 3(4): 55-68. (cited in Oct. 19, 2015 OA).
"Plug-in (computing)", Wikipedia page, retrieved from URL https://web.archive.org/web/20080825210331 /http://en.wikipedia.org/wiki/Plug-in_(computing) on Sep. 14, 2015; Wayback Machine date of Aug. 25, 2008, 1 pg. (cited in Oct. 19, 2015 OA).
Chinese Third Office Action dated Aug. 28, 2015 in Appln No. 201180022229.X, 6 pgs.
Office Action mailed Sep. 24, 2015, in U.S. Appl. No. 12/771,290, 27 pgs.
Office Action mailed Sep. 25, 2014, in U.S. Appl. No. 13/106,149, 41 pgs.
Office Action mailed Oct. 19, 2015, in U.S. Appl. No. 12/492,588, 41 pgs.
Office Action mailed Mar. 12, 2014, in U.S. Appl. No. 13/106,149, 33 pgs.
Office Action mailed Mar. 27, 2014, in U.S. Appl. No. 12/943,668, 41 pgs.
Notice of Allowance mailed Apr. 11, 2014 in U.S. Appl. No. 13/106,307, 26 pgs.
U.S. Appl. No. 13/106,149, Office Action mailed Jul. 18, 2016, 42 pages.
Chinese Fourth Office Action dated Jun. 29, 2016 in Appln No. 201180021588.3, 10 pages.

* cited by examiner

| AdapterId | Description | ConfigData | AssemblyName | IdleTime | Impersonate_Account | DayOfWeek | HourOfDay |
|---|---|---|---|---|---|---|---|
| 1 | Active Directory Collector | GC://company.com | ActiveDirectoryOMAdapter.dll | 360 | NULL | 6 | 1 |
| 2 | Company SharePoint WSCL Collector | http://companyweb.loc | SharePoint14WSCLAdapter.dll | 120 | NULL | NULL | NULL |
| 3 | Company SharePoint IISLog | http://companysitename:SomePort/logs = OtherServerbaes | IISLog14Adapter.dll | 180 | NULL | NULL | NULL |
| 4 | Distribution Lists Mail Adapter | forceFullCrawl=false | DLMailAdapter.dll | 300 | SomeDomain\Service Account | NULL | NULL |
| 5 | Company Other SharePoint IISLog | http://companyothersite/YetAnother/OtherServerbaes | IISLog14Adapter.dll | 360 | NULL | NULL | NULL |

SISR Adapter Log

Adapter Configuration

| Parameter | Value |
|---|---|
| ID | 22 |
| Description | IISLOG Adapter http://office |
| Configuration | http://office*true*\\10.195.203.162\iislogs\LogFiles#\\10.195.203.163\iislogs\LogFiles#\\10.195.203.164\iislogs\LogFiles#\\home\iislogs\LogFiles#\\homedogvm303\iislogs\LogFiles |
| Assembly | IISLog14Adapter.dll |
| Idle Time | 900 |
| Impersonate | REDMOND\olsvc |
| Site | http://office |
| Skips Metadata | true |
| Log Location | \\10.195.203.162\iislogs\LogFiles |
| Log Location | \\10.195.203.163\iislogs\LogFiles |
| Log Location | \\10.195.203.164\iislogs\LogFiles |
| Log Location | \\homedogvm301\iislogs\LogFiles |
| Log Location | \\homedogvm302\iislogs\LogFiles |
| Log Location | \\homedogvm303\iislogs\LogFiles |
| Collector | olsocalclctr1 |

FROM FIG. 5A

| Adapter Log | | |
|---|---|---|
| Created | Context | Message |
| 3/11/2011 2:21:51 AM | Adapter | Adapter exited. Reason: 'OK' |
| 3/11/2011 2:21:51 AM | \\homedogvm302\iislogs\LogFiles\W3SVC1439681206 | Processed 0 files in folder '\\homedogvm302\iislogs\LogFiles\W3SVC1439681206'. Processing at '3/11/2011 2:21:50 AM' taking 00:00:00.0781240. Parsed 0 rows and added 0 activities. |
| 3/11/2011 2:21:51 AM | \\homedogvm302\iislogs\LogFiles\W3SVC1439681206\u_ex110310.log | Succeeded processing file '\\homedogvm302\iislogs\LogFiles\W3SVC1439681206\u_ex110310. completed on '3/11/2011 2:21:50 AM' taking 00:00:00.0781240. Processed 0 rows with 0 activities. |
| 3/11/2011 2:21:50 AM | \\homedogvm302\iislogs\LogFiles\W3SVC1439681206 | Folder has '1' files, last updated '3/10/2011 10:06:11 PM' UTC. |
| 3/11/2011 2:21:50 AM | \\homedogvm302\iislogs\LogFiles\W3SVC1\u_ex110310.log | Succeeded processing file '\\homedogvm302\iislogs\LogFiles\W3SVC1\u_ex110310.log' which on '3/11/2011 2:21:50 AM' taking 00:00:00.0156248. Processed 0 rows with 0 activities created. |
| 3/11/2011 2:21:50 AM | \\homedogvm302\iislogs\LogFiles\W3SVC1 | Processed 0 files in folder '\\homedogvm302\iislogs\LogFiles\W3SVC1'. Processing started at '3/11/2011 2:21:50 AM' taking 00:00:00.0156248. Parsed 0 rows and added 0 activities. |
| 3/11/2011 2:21:50 AM | \\homedogvm302\iislogs\LogFiles\W3SVC1 | Folder has '1' files, last updated '3/10/2011 4:48:32 PM' UTC. |
| 3/11/2011 2:21:50 AM | \\homedogvm301\iislogs\LogFiles\W3SVC1439681206\u_ex110310.log | Succeeded processing file '\\homedogvm301\iislogs\LogFiles\W3SVC1439681206\u_ex110310. completed on '3/11/2011 2:21:50 AM' taking 00:00:00.0624992. Processed 0 rows with 0 activities. |
| 3/11/2011 2:21:50 AM | \\homedogvm301\iislogs\LogFiles\W3SVC1439681206 | Processed 0 files in folder '\\homedogvm301\iislogs\LogFiles\W3SVC1439681206'. Processing at '3/11/2011 2:21:50 AM' taking 00:00:00.0624992. Parsed 0 rows and added 0 activities. |
| 3/11/2011 | | |

FIG. 5B

COLLECTION OF INTRANET ACTIVITY DATA

CROSS REFERENCE TO RELATED APPLICATIONS

This application is related to co-pending: U.S. patent application Ser. No. 12/773,319, titled "Presentation of Information Describing User Activities With Regards To Resources," filed on May 4, 2010; U.S. patent application Ser. No. 12/771,290, titled "Prioritization of Resources Based On User Activities," filed on Apr. 30, 2010; U.S. patent application Ser. No. 13/106,307, titled "Automatic Social Graph Calculation," filed concurrently herewith; and U.S. patent application Ser. No. 13/106,149, titled "Personalized News Feed Based on Peer and Personal Activity," filed concurrently herewith; each of which is hereby incorporated by reference as to its entire contents.

FIELD OF THE INVENTION

The present invention generally relates to computer networks and more particularly to systems, methods and computer program products for facilitating the collection of data within such networks.

BACKGROUND

In today's technological environment, it is common for business enterprises and other organizations to deploy private computer networks—intranets—to securely share such organization's information or network operating systems within that organization. The term "intranet" is used in contrast to "internet", which is a network between organizations, the most common of which is the global, public Internet. That is, an intranet is a network within an organization which sometimes refers only to the organization's internal (private) website, but may be a more extensive part of the organization's information technology (IT) infrastructure. It may host multiple private websites and constitute an important component and focal point of internal communication with, and collaboration among, individual computer users associated/affiliated with the organization (e.g., students within a university, co-workers within a company or local, state or federal government department or agency, co-workers within a charitable or any other type of organization).

As individual computer users associated/affiliated with the organization perform various computer-based activities while logged into the organization's intranet, there are a constant stream of activities occurring such as navigating to URLs, opening and editing documents, writing, opening and reading email messages, and the like. Information about these activities can be very useful (e.g., augmenting documents with extra information, improving search results, creating automatic news feeds, sending social networking announcements, etc.). Normally, however, such information is not collected within intranets and is lost. Yet, collecting, consolidating, storing and exposing activity information while ensuring privacy requirements allows for a number of high-value services to be built and offered based on such information.

Should such information be collected, there is one concern that must be addressed—privacy. That is, protecting personal privacy is more complex in the information age. As more and more business is transacted "online," the volume of personal information available on computer networks continues to grow. Thus, individuals using these computer networks are demanding greater control over how their personal information is stored, used and shared. Also, organizations are seeking better ways to manage and safeguard the sensitive personal data in their custody. In response, many governments on the national (e.g., federal), state and local level, have passed laws dealing with individuals' privacy—especially concerning Personally Identifiable Information (PII) which is any information that identifies or can be used to identify, contact, or locate the person to whom such information pertains, or from which identification or contact information of an individual person can be derived. More specifically, PII includes names, addresses, and phone numbers as the more obvious examples. Email addresses and IP addresses may also be included in this category. An emerging category of such information includes geo-location information that allows the sharing of the physical location of the user, a feature that is becoming popular in location-based services and social networking scenarios.

Sensitive PII includes financial profiles, health profiles, national ID numbers, social security numbers, credit card information, and other information designated as such by legislation (e.g., race, ethnicity, political opinions, religious or philosophical beliefs, trade-union membership, sex life, etc.). Collecting sensitive PII data may bring enhanced exposure to legal, regulatory, and political risks and requires additional safeguards for data security, integrity and notice.

Collective information is a more subtle issue for privacy issue spotting because a single piece of information such as website usage would seem relatively benign and by itself would not be PII. However, data collected over time for online behavior such as search, web surfing, and social networking habits may eventually allow the user's identity to be discovered using data mining and correlation methods.

Privacy concerns are exacerbated in the context of private networks such as intranets. This is because use of these private networks requires users to log in with a "user id" and password assigned by the owner of the network (e.g., the user's employer). This destroys the anonymity provided by other networks such as the Internet.

Given the foregoing, what are needed are systems, methods and computer program products for facilitating the collection of data within a computer network (especially an intranet) to allow for the provisioning of high-value services while complying with applicable privacy laws and regulations, as well as individual organizations' rules and policies addressing intranet users' privacy.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by providing systems, methods and computer program products for facilitating the collection, consolidating, storing and exposing of data within a computer network (especially an intranet) to allow for the provisioning of high-value services while complying with all applicable privacy laws and regulations (i.e., all national and local privacy laws and regulations that are applicable given the one or more jurisdictions in which the computer network traverses), as well as individual organizations' rules/policies addressing their intranet users' privacy.

In an embodiment, a set of configurable data collectors which are operating on variety of existing data sources within an intranet, such as web content management log files, document management log files, web server log files, proxy server log files, directory service information, email servers, and the like, are combined with a local or cloud based-storage, and configuration, status and retrieval services to transform, aggregate and anonymize collected information as needed for the provisioning of high-value services, and as required by all applicable privacy laws or organizational policies.

Further features and advantages of the present invention, as well as the structure and operation of various embodiments of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

The present invention is directed to systems, methods and computer program products for facilitating the collection, consolidating, storing and exposing of data within a computer network (especially an intranet) to allow for the provisioning of high-value services while complying with all applicable privacy laws and regulations, as well as individual organizations' rules/policies addressing their intranet users' privacy. In various embodiments, such high-value services offered to the intranet's users include augmenting documents with extra information, improving search results, creating automatic news feeds, creating social networking announcements, and/or the like.

Figure 1:
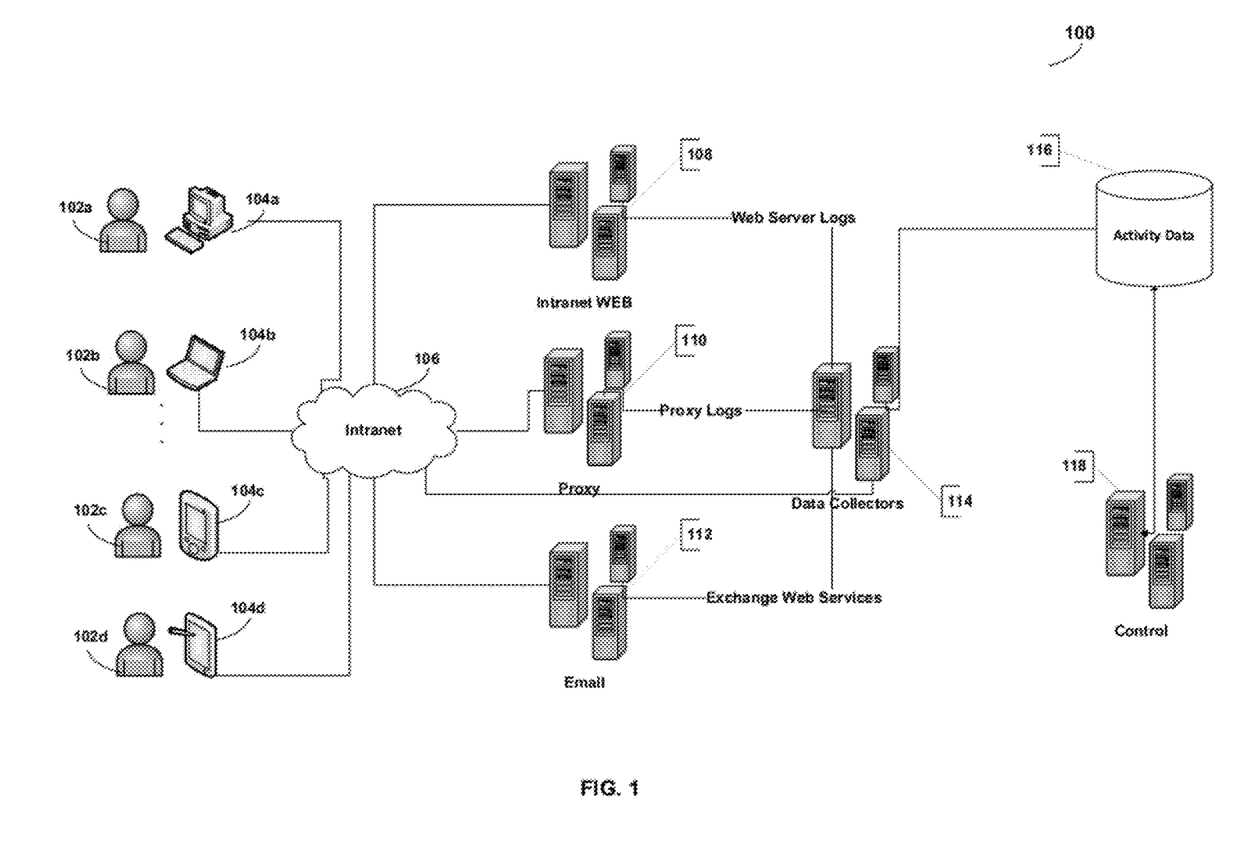
FIG. 1 is a block diagram illustrating an exemplary intranet activity data collection system according to an embodiment of the present invention.

Referring to FIG. 1, a block diagram illustrating an exemplary intranet activity data collection system 100, according to an embodiment of the present invention, is shown.

Intranet activity data collection system 100 includes a plurality of users 102 (shown as users 102a-d in FIG. 1) accessing, via a computing device 104 (shown as devices 104a-d in FIG. 1), an organization's intranet (i.e., private network) 106. As will be appreciated by those skilled in the relevant art(s) after reading the description herein, intranet 106 may be a private network deployed by an organization such as a business enterprise for use by its employees, deployed by a university for use by its students and faculty, deployed by a government agency for its workers, and the like. As will also be appreciated by those skilled in the relevant art(s) after reading the description herein, system 100 may be deployed across one or more jurisdictions as, for example, a multinational business enterprise makes its intranet 106 available to its employees around the world. This would thus subject system 100 to a plurality of national, state and/or local privacy laws and regulations that are applicable in such one or more jurisdictions in which intranet 106 spans.

In various embodiments, device 104 may be configured as a desktop 104a, a laptop 104b, a PDA 104c, a tablet or mobile computer 104d, an intelligent communications device or the like.

As users 102 log into intranet 106, they perform various computer-based tasks while logged into the organization's intranet. Thus, there are constant streams of activities occurring such as navigating to URLs, opening and editing documents, writing, opening and reading email and/or instant messages, and the like. System 100 thus further includes one or more data collection servers 114 which perform the importing and processing of raw (user 102) activity data from various sources within system 100. In an embodiment, such sources of raw activity data include log files from one or more intranet web servers 108, one or more proxy servers 110, and one or more email servers 112. In alternate embodiments, data collection servers 114 may receive raw activity data directly (via intranet 106) from one or more client-side activity collection applications executing in the background on any of devices 104.

In an alternative embodiment of the present invention, each collection server 114 can host one or more activity data collection rules (or "adapters") which are designed to retrieve data from a specific data source (e.g., web server 108, proxy server 110, email server 110, a client-side logging application executing on device 104, and/or the like). In such an embodiment, all adapters share a common collector infrastructure which includes one or more of the following:

1. Logging services which allow for monitoring and troubleshooting of a specific adapter.
2. Software watch-dog service which terminates and restarts collection should it stop progressing for whatever reason.
3. State service which allows for terminating and resuming collection at any moment for whatever reason such as maintenance or network failure without need to run complete collection again.
4. Data normalization services which allow for presenting activity subject (e.g., which URL a user 102 clicked on) in non-ambiguous way.
5. Data filtering services which allows only desired information to be stored in data storage 116 in an effort to reduce total required storage space.
6. Policy enforcing services which implements a set of rules in accordance with privacy laws and/or organizational rules at any stage of the process (collection, aggregation, access, etc.).

In alternate embodiments, other sources of activity data within system 100 may include directory service information, web content management log files, document management log files (e.g., high business impact, web server log files, proxy server log files, email distribution lists or news groups, instant messages, text messages, telephone calls, and the like).

System 100 also includes a data storage 116, which can be local (e.g., an on-site database such as one or more SQL servers) or cloud based (e.g., the SQL Azure™ storage platform available from Microsoft Corporation of Redmond, Wash.), which stores the data collected by servers 114 in a unified format. In an alternate embodiment, data stored within database 116 (and the network connections thereto) may be encrypted to ensure compliance with privacy laws and organizational rules.

In an embodiment, system 100 includes one or more control servers 118 that are used for configuration, status and data retrieval control. That is, control servers 118 monitor the collection of activity data as well as allow the data to be consumed for the provisioning of high-value services (not shown in FIG. 1) as permitted by any applicable privacy laws and organizational rules.

Figure 5A:
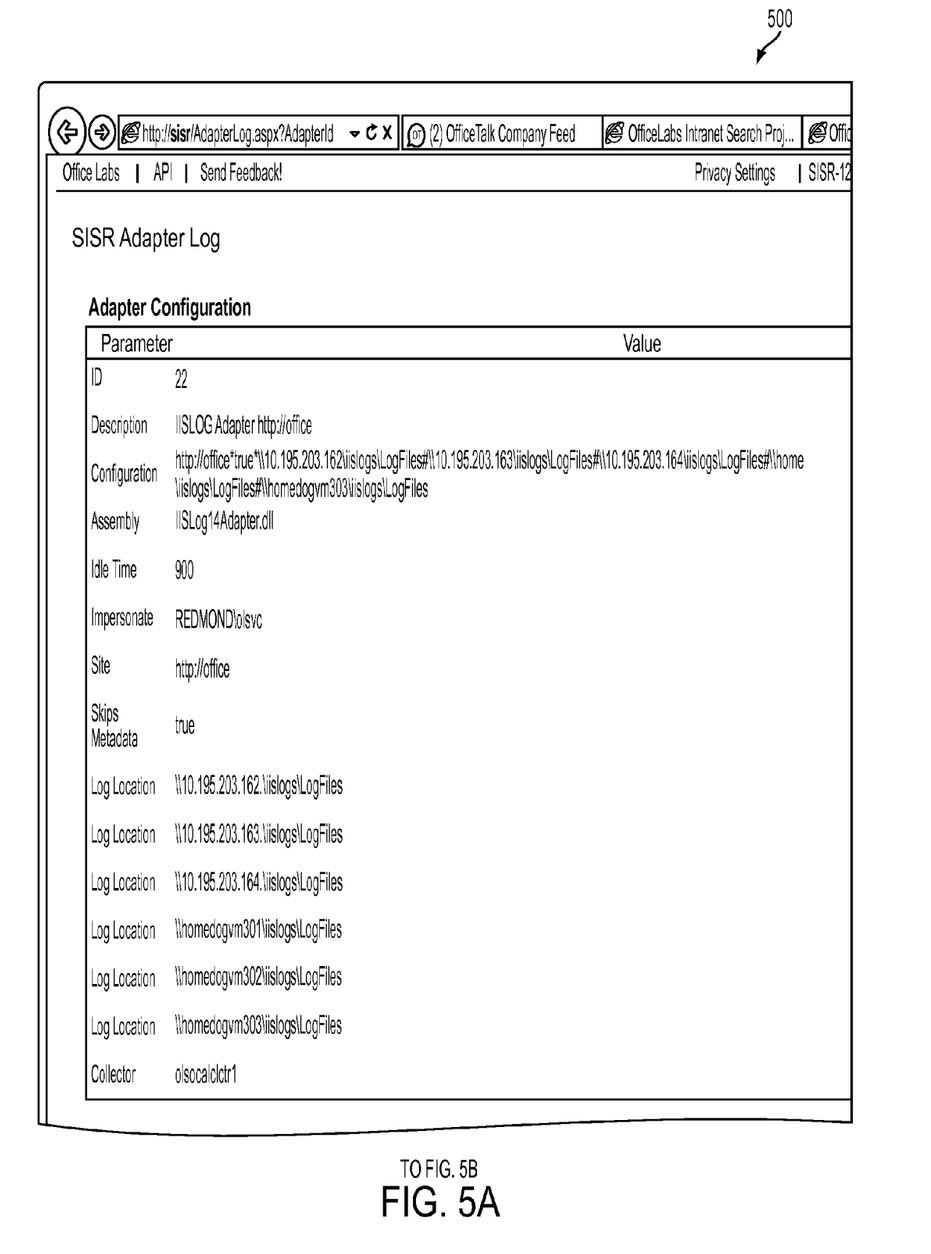
FIG. 5 is a screenshot illustrating an exemplary graphical user interface window for the management of activity data collection and consumption according to an embodiment of the present invention.

In an alternate embodiment, control servers 118 may employ a web interface (e.g., the SharePoint® web platform available from Microsoft Corporation of Redmond, Wash.) to allow intranet administrators to configure and monitor data collection and data consumption. For example, such a web platform can be used as a base and can allow for complete configuration and monitoring of system 100 such as the location of log files, access credentials, privacy and organizational rules, data filtering and the like as shown in screenshot 500 of FIG. 5.

In an alternate embodiment, an intranet administrator would have access to control servers 118 via a web service-based application programming interface (API) (e.g., Simple Object Access Protocol (SOAP) or RESTful). In such an embodiment, the intranet administrator may enforce privacy laws and organizational rules based on access credentials. For example, an unprivileged user might be allowed to retrieve the total number specific documents being accessed within intranet 106, while an authorized user can retrieve more detailed information such as which user 102 accessed certain documents and when. This allows privacy protection while storing complete and detailed information as permitted by applicable privacy laws and organizational rules.

In various embodiments, control servers 118 allow for built-in support for enforcing privacy laws and organizational rules, including facilities for the following:
1. Access rules which define who can access the data and in which way (e.g., detailed versus anonimzed).
2. Exclusion rules which define groups of users 102 or data sources from which collection should not be performed. For example, users 102 from the organization's legal department, C-level executives and the like can be excluded from collection to protect privileged/sensitive information. Or, users from particular geographical location can be excluded if privacy laws at that location prohibit or restrict activity collection. Sites which are considered "high business impact" can be also excluded (e.g., based on data automatically collected from directory service information or web content management application servers).
3. Aggregation and/or transformation rules which may aggregate data from certain sites where privacy laws or organizational policies permit collection of data in anonimized, aggregated form. These rules can apply during both collection of the data, as well as while exposing of the data (e.g., based on access rules).
4. Consent rules which allows users 102 to have notice of the data collection within system 100 and choose whether to participate. Consent may take several forms: Opt-in consent where user 102 has to take an affirmative action before data is collected; or Opt-out consent where user 102 can take an affirmative action to prevent the collection of data before that data is collected.

Figure 2:
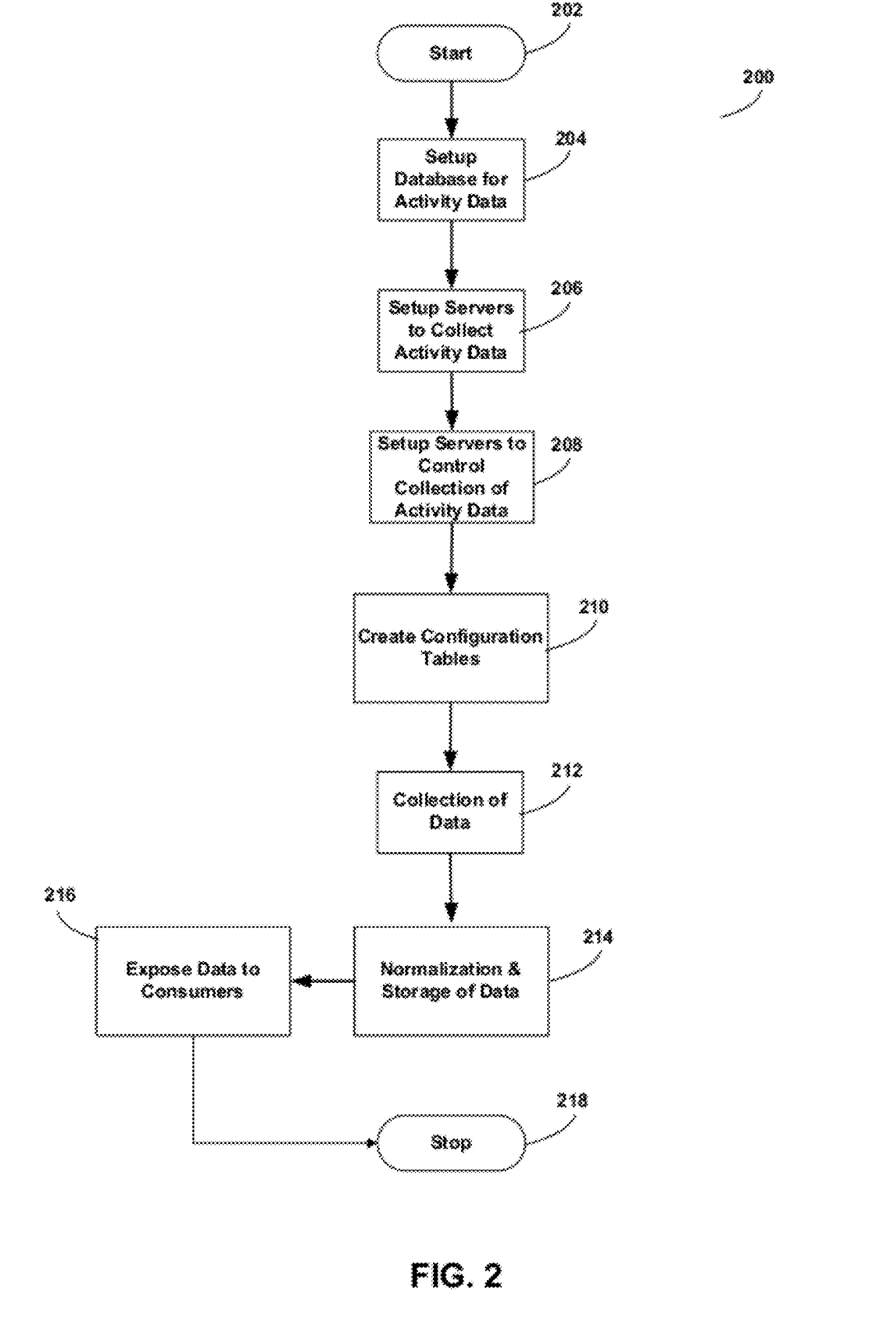
FIG. 2 is a flowchart illustrating an exemplary intranet activity data collection process according to an embodiment of the present invention.

Referring to FIG. 2, a flowchart illustrating an intranet data collection process 200, according to an embodiment of the present invention, is shown. Process 200, which would execute within system 100, begins at step 202 with control passing immediately to step 204.

In step 204, database 116 is setup and deployed within system 100 (locally or cloud-based) to store all intranet 106 activity data collected by process 200.

In step 206, one or more data collection servers 114 are deployed within system 100 to access and collect activity data from data sources within intranet 106—such as web servers 108, proxy servers 110, email servers 112, and client-side logging applications running on one or more devices 104, and to eventually store the collected activity data into database 116.

In step 208, one or more control servers 118 are deployed within system 100 to control data collection from intranet 106 and expose the collected data to various consumers implementing high-value services.

In step 210, one or more configuration tables are created within control servers 118 to specify the activity data to be collected by collection servers 114. That is, the configuration table, in an embodiment, reflects the access rules, aggregation and/or transformation rules, exclusion rules, and consent rules specified by the administrator of intranet 106 reflecting the one or more applicable jurisdictions' privacy laws or regulations and the one or more of the organization's policies.

In step 212, process 200 begins to collect activity data in accordance with the one or more configuration tables loaded onto control servers 118 by, for example, an intranet administrator.

In step 214, the activity data collected by collection servers 114 are normalized and then stored in database 116. In an embodiment, data normalization 214 occurs in process 200 based on item meaning. For example, if a user 102 opens a spreadsheet document, action is taken on that document no matter how it was opened (e.g., saved to the disk from a website, opened from a spreadsheet application directly or opened from a spreadsheet application web viewer). All these cases might result in different URLs, while they all represent the same document (and thus should all reflect the same activity data). Thus, in such an embodiment, the normalization process 214 may first detect the fact that the document was opened via a web viewer, and then extracts the file location. In such a case, activity data would be recorded by process 200 based on the document location as opposed to being based on the original URL.

In an alternate embodiment, data normalization 214 occurs in process 200 based upon canonical URL representations. In such an embodiment, data normalization resolves textually different URLs that are logically equivalent into one URL for data integrity purposes. This involves disassembling a URL and then reconstructing it such that the resulting URL has a unified format, same escape sequences and/or encoding, same query string parameter order and the like.

In step 216, collected data is exposed to consumers (i.e., applications and/or servers not shown in FIG. 1) providing high-value services as determined by the rules set in step 210.

Process 200 then terminates as indicated by step 218.

As will be appreciated by those skilled in the relevant art(s) after reading the description herein, in various embodiments, steps 212-216 may be repeated according to one or more pre-determined time schedules based upon the requirements of one or more high-value services built and offered to users 102 based on such information (e.g., augmenting documents with extra information, improving search results, automatic news feeds, social networking announcements, etc.).

As will also be appreciated by those skilled in the relevant art(s) after reading the description herein, step 210 may be repeated anytime the intranet administrator needs to update the one or more configuration tables to specify the activity data collected by updating one or more access rules, aggregation and/or transformation rules, exclusion rules, consent rules in response to: a change in one or more applicable jurisdictions' privacy laws or regulations; a change in one or more of the organization's policies; and/or the new or changing data requirements of one or more high-value services being provisioned to users 102 based upon such collected activity data.

Figure 4:
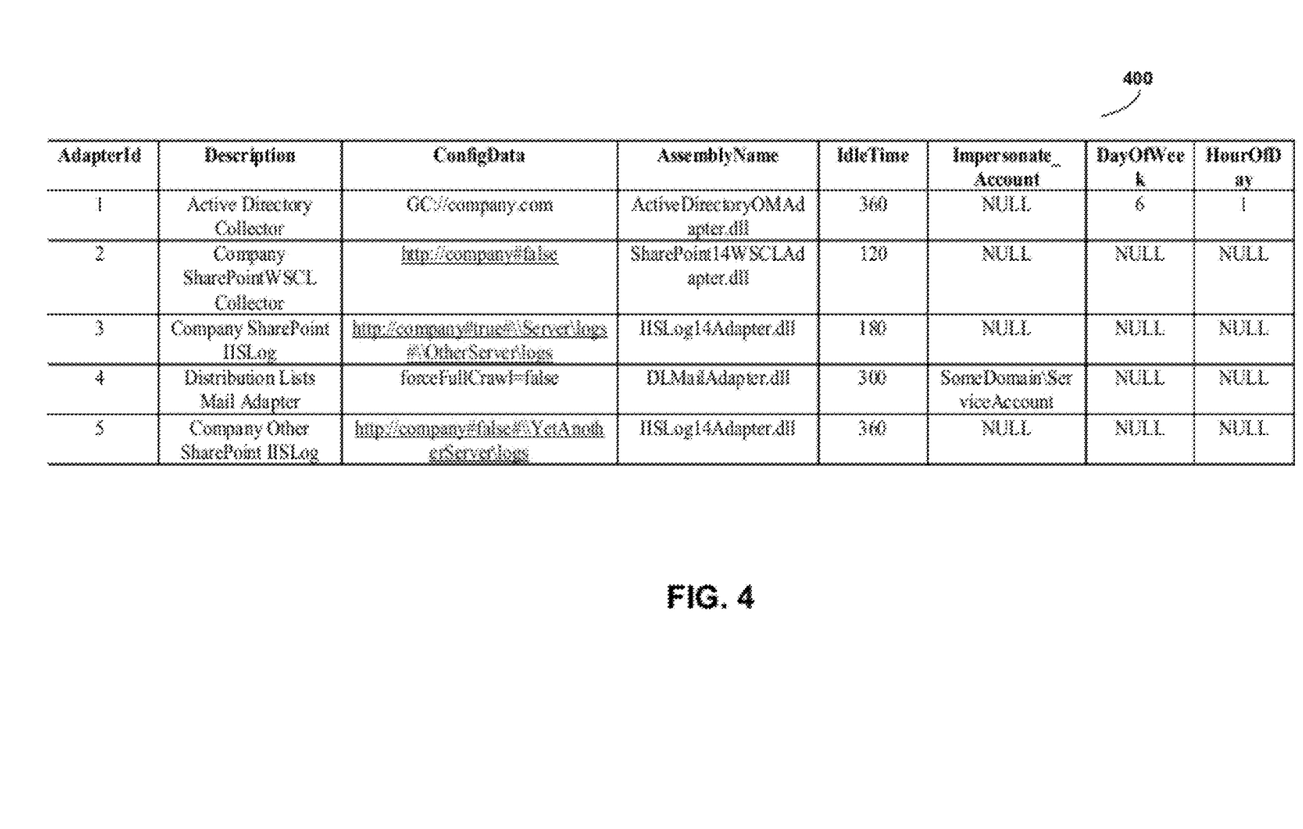
FIG. 4 is an exemplary activity data collection configuration table according to an embodiment of the present invention.

Referring to FIG. 4, a sample activity data collection configuration table 400, in one embodiment of the present invention, is shown. In such an embodiment, intranet 106 utilizes the SHAREPOINT® web platform available from Microsoft Corporation of Redmond, Wash. Thus, in such an embodiment, table 400 contains the following fields: "AdapterId"—the primary key in the table and may indicate which of the plurality of collector servers 114 the activity data collection rule (or "adapter") specified by the table entry is to execute upon; "Description"—a free text description for administrative purposes; "ConfigData"—a configuration string for specific adapter type (e.g., a domain name from which to collect active directory data (ID 1), URL of a SharePoint site from which to collect metadata (ID 2), URL of the site, and location of the IIS log files (ID 3 and ID 5) and other data as applicable (ID 4)); "AsemblyName"—the name of the computer executable code file which contains the actual implementation of the adapter; "IdleTime"—time (in seconds) between collections; "ImpersonateAccount"—alternative credentials to collect data where if it is not set, then the default credentials would be used; "DayOfWeek" and "HourOfDay"—the execution schedule (e.g., execute only during night hours or on weekends), and if it is not set, then collection is run continuously while giving effect to the "IdleTime" filed.

In an alternate embodiment, a configuration table may contain a list of "blacklisted" users and items (e.g., URLs) stored in an XML or other formatted file. In such an embodiment, "users" may include users 102 who opted-out of activity collection or even crawling robots executing within system 100 to make intranet 106 operational and thus such activity data is not useful for the provisioning of high-value services. Items, on the other hand, might be blacklisted for multiple reasons (e.g., privacy or a commonly-used API within intranet 106).

In another embodiment, a configuration table may include rules for extracting specific patterns of usage (e.g., access to a specific productivity application or website). In such an embodiment, these rules may be implemented as series of accept/reject rules which are chained together. Such rules can simply be the (whole or partial) matching of URLs, or more sophisticated such as looking up the URL history of a user 102 so an actual pattern is triggered by more than one record in the web server log file. Further, there can be line of business (LOB)-specific information rules which search for application-specific patterns (e.g., searching for ISBN codes in the URLs of visited sites, thus making it possible to determine book-related activities by users 102).

In yet another embodiment, a configuration table may include rules to exclude items which may present privacy concerns or might have a high business impact. For example, such a configuration table may be formatted as follows:

| ItemId | URL | UriCheckSum |
|--------|-----|-------------|
| 6864 | http://sharepoint/SensitiveSubSite | −2123596221 |
| 6865 | http://AnotherSensitiveSite | −1226526623 |

In such a configuration table, the "ItemId" field is a surrogate primary key, the "URL" field is the item's URL and the "UriCheckSum" filed is a checksum for fast searching. A similar table may be employed for users to be excluded from the activity data collection process (where a UserID would replace the URL field in the configuration table) based on engaging in an opt-out procedure, or checking a jurisdictional domain based on any applicable national and/or local privacy laws and regulations.

Figure 3:
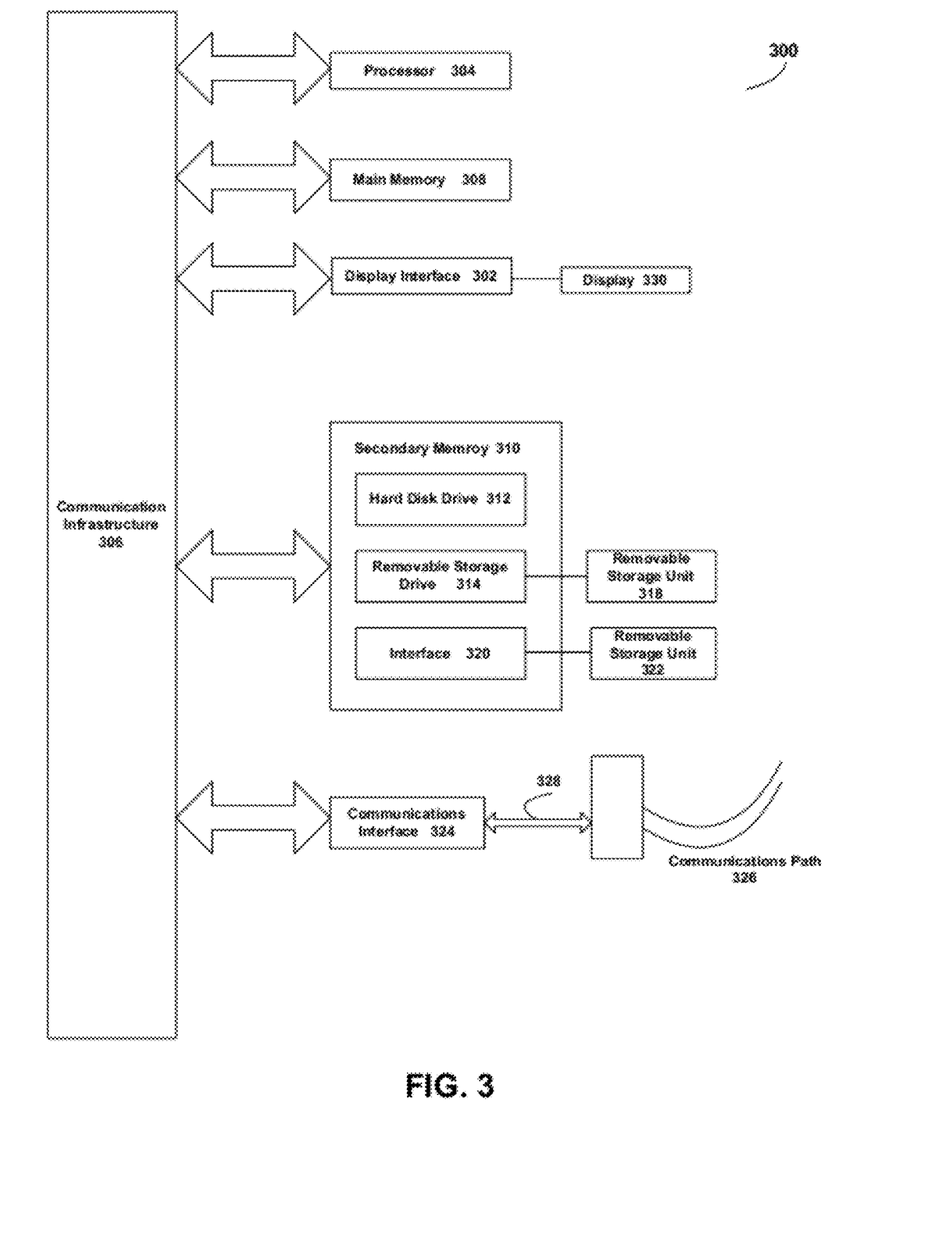
FIG. 3 is a block diagram of an exemplary computer system useful for implementing the present invention.

In one embodiment, the present invention (i.e., system 100, process 200 or any components thereof) is directed toward one or more computer systems capable of carrying out the functionality described herein. An example of a computer system 300 is shown in FIG. 3.

Computer system 300 includes one or more processors, such as processor 304. The processor 304 is connected to a communication infrastructure 306 (e.g., a communications bus or network). Various software aspects are described in terms of this exemplary computer system. After reading this description, it will become apparent to a person skilled in the relevant art(s) how to implement the invention using other computer systems and/or architectures.

Computer system 300 can include a display interface 302 that forwards graphics, text and other data from the communication infrastructure 306 (or from a frame buffer not shown) for display on the display unit 330.

Computer system 300 also includes a main memory 308, preferably random access memory (RAM) and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative aspects, secondary memory 310 may include other similar devices for allowing computer programs or other code or instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of non-transitory signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 314, a hard disk installed in hard disk drive 312 and signals 328. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 3 may be configured as a desktop, a laptop, a server, a tablet computer, a PDA, a mobile computer, an intelligent communications device or the like.

In yet another embodiment, the invention is implemented using a combination of both hardware and software.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures. For example, the systems, methods and computer program products for facilitating the collection of intranet activity data while complying with applicable privacy laws and regulations and organizational policies disclosed herein are also applicable to other networks such as internets.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A system for collection of activity data related to a plurality of authenticated computer network users, comprising:
    a data collection server, deployed within said computer network, configured to collect raw activity data related to said plurality of users from sources within said computer network, wherein said sources include at least some of a web content management server, a document management server, a web server, a proxy server, a directory service information server, an email server, or a client-side logging application, the data collection server being configured to normalize the raw activity data to provide normalized activity data associated with the document, wherein normalization of the raw activity data resolves differences of actions on the document by unifying saving the document, directly opening the document, and opening the document via textually different URLs such that the activity data reflects activity data associated with the document, wherein the textually different URLs are resolved to be logically equivalent by disassembling the textually different URLs and reconstructing a URL having a unified format; and
    a control server coupled to said data collection server, said control server having a processor and a memory storing at least one configuration table containing at least one rule based on which said control server is configured to regulate the collection, transformation, aggregation, and anonymization of said raw activity data related to said plurality of users to generate user activity data on said computer network in compliance with at least one privacy law and/or at least one organizational privacy policy, wherein personally identifiable information is removed from the user activity data, wherein said at least one rule includes a schedule to collect activity data from said sources and an exclusion rule which defines a subset of said plurality of users and/or sources from which collection of activity data is not allowed.

2. The system of claim 1, wherein said at least one rule contained in said at least one configuration table is one of: an access rule; an aggregation rule; a transformation rule; an exclusion rule; and a consent rule.

3. The system of claim 1, further comprising:
    means for providing a graphical user interface to allow the editing of said at least one configuration table in order to comply with at least one of: a change in the at least one privacy law; and the at least one organizational privacy policy.

4. The system of claim 1, further comprising means for providing at least one of: augmenting documents with extra information; improving search results; automatic news feeds; and social networking announcements to said plurality of users based on said user activity data stored in said database.

5. The system of claim 1, wherein said activity data is data related to one of the plurality of users and results from said one of the plurality of users: navigating to a URL; opening a document; editing a document; writing an email; opening an email; reading an email; sending an instant message; and receiving an instant message.

6. A computer-implemented method for collecting activity data related to a plurality of authenticated computer network users, said method comprising:
  collecting, by a processor, raw activity data related to said plurality of users from sources within said computer network, wherein said sources include at least some of a web content management server, a document management server, a web server, a proxy server, a directory service information server, an email server, or a client-side logging application;
  regulating, by a processor, collection, transformation, aggregation, and anonymization of said raw activity data related to said plurality of users from said sources based on at least one rule in a configuration table to generate user activity data on said computer network in compliance with at least one privacy law and/or at least one organizational privacy policy, wherein personally identifiable information is removed from said user activity data, wherein said at least one rule includes an exclusion rule that defines a subset of said plurality of users from whom collection of activity data is not allowed, said subset of said plurality of users being from a particular geographical location or a group within an organization;
  normalizing, by a processor, the raw activity data to provide normalized activity data associated with the document, wherein normalizing the raw activity data resolves differences of actions on the document by unifying saving the document, directly opening the document, and opening the document via textually different URLs such that the activity data reflects activity data associated with the document, wherein the textually different URLs are resolved to be logically equivalent by disassembling the textually different URLs and reconstructing a URL having a unified format; and
  storing, by a processor, said user activity data in a database.

7. The computer-implemented method of claim 6, wherein said at least one rule contained in said at least one configuration table is one of: an access rule; an aggregation rule; a transformation rule; an exclusion rule; and a consent rule.

8. The computer-implemented method of claim 6, wherein said at least one rule includes an exclusion rule which defines a subset of said plurality of users from whom collection of activity data is not allowed, said subset of said plurality of users being from a particular geographical location.

9. The computer-implemented method of claim 6, further comprising
  receiving an edit, via a graphical user interface, of said at least one configuration table in order to comply with at least one of: a change in the at least one privacy law; and the at least one organizational privacy policy.

10. The computer-implemented method of claim 6, wherein said activity data is data related to one of the plurality of users and results from said one of the plurality of users: navigating to a URL; opening a document; editing a document; writing an email; opening an email; reading an email; sending an instant message; and receiving an instant message.

11. The computer-implemented method of claim 6, wherein said at least one rule specifies a pre-determined schedule to collect activity data from said at least one source.

12. A computer-implemented method for collecting activity data related to a plurality of authenticated computer network users, said method comprising:
  collecting, by a processor, raw activity data of said plurality of users from sources within said computer network, wherein said sources include at least some of a web content management server, a document management server, a web server, a proxy server, a directory service information server, an email server, or a client-side logging application, and wherein said activity data include data corresponding to at least one of navigating to a URL, opening a document, editing a document, writing an email, opening an email, reading an email, sending an instant message, or receiving an instant message;
  generating, by a processor, user activity data in compliance with at least one privacy law and/or at least one organizational privacy policy via transformation, aggregation, and anonymization of said raw activity data based on at least one rule in a configuration table such that personally identifiable information is removed from the user activity data, wherein said at least one rule includes an access rule, an aggregation rule, a transformation rule, an exclusion rule, or a consent rule, wherein the exclusion rule defines
  a subset of said plurality of users from whom collection of activity data is not allowed, said subset of said plurality of users being from a particular geographical location or a group within an organization;
  normalizing, by a processor, the raw activity data to provide normalized activity data associated with the document, wherein normalizing the raw activity data resolves differences of actions on the document by unifying saving the document, directly opening the document, and opening the document via textually different URLs such that the activity data reflects activity data associated with the document, wherein the textually different URLs are resolved to be logically equivalent by disassembling the textually different URLs and reconstructing a URL having a unified format; and
  storing, by a processor, said user activity data in a database.

13. The computer-implemented method of claim 12, wherein said at least one rule includes an exclusion rule which defines that at least one of a web content management server, a document management server, a web server, a proxy server, a directory service information server, an email server, or a client-side logging application from which collection of activity data is not allowed.

14. The computer-implemented method of claim 12, wherein said at least one rule includes a consent rule that provides notice of data collection to said users and allows said users to choose whether to participate.

15. The computer-implemented method of claim 12, wherein collecting raw activity data includes receiving said raw activity data from a client-side logging application executing on a computing device associated with one of said plurality of users.

\* \* \* \* \*